United States Patent
Nguyen et al.

(10) Patent No.: US 9,812,963 B1
(45) Date of Patent: Nov. 7, 2017

(54) CURRENT DETECTION AND AVERAGING CIRCUIT FOR SWITCHING POWER SUPPLIES WITH A HALF-BRIDGE SWITCH CIRCUIT TOPOLOGY

(71) Applicant: Monolithic Power Systems, Inc., San Jose, CA (US)

(72) Inventors: James Nguyen, San Jose, CA (US); Francis Yu, Sunnyvale, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 15/161,013

(22) Filed: May 20, 2016

(51) Int. Cl.
*H02M 3/158* (2006.01)

(52) U.S. Cl.
CPC .................. *H02M 3/158* (2013.01)

(58) Field of Classification Search
CPC .... H02M 3/156–3/158; H02M 3/1582; H02M 3/1584; Y02B 70/1466
USPC ................. 323/271, 272, 282–290
See application file for complete search history.

(56) References Cited

U.S. PATENT DOCUMENTS

| | | | |
|---|---|---|---|
| 7,710,084 B1 * | 5/2010 | Guo ..................... | G01R 19/003 323/224 |
| 9,548,661 B2 * | 1/2017 | Ryotaro ............. | H02M 3/1588 |
| 2012/0106206 A1 * | 5/2012 | Tang .................. | H02M 1/4258 363/21.02 |
| 2016/0254750 A1 * | 9/2016 | Grezaud ................ | H02M 1/08 |

\* cited by examiner

*Primary Examiner* — Yemane Mehari
(74) *Attorney, Agent, or Firm* — Okamoto & Benedicto LLP

(57) ABSTRACT

A power supply includes a half-bridge circuit. The power supply further includes an output inductor connected to a switch node that is common to a high side switch and a low side switch of the half-bridge. During a turn ON time of the low side switch, a current detection circuit of the power supply samples and holds in a capacitor a valley of an inductor current flowing through the output inductor. Also during the turn ON time of the low side switch, the current detection circuit samples and holds in another capacitor a peak of the inductor current. During a turn OFF time of the low side switch, a sense inductor current that is representative of the inductor current is generated by combining the charges stored in the capacitors.

13 Claims, 8 Drawing Sheets

CURRENT DETECTION AND AVERAGING CIRCUIT FOR SWITCHING POWER SUPPLIES WITH A HALF-BRIDGE SWITCH CIRCUIT TOPOLOGY

BACKGROUND OF THE INVENTION

1. Field of the Invention

The present invention relates generally to electrical circuits, and more particularly but not exclusively to inductor current sensing.

2. Description of the Background Art

A switching power supply includes a switch circuit, such as a half-bridge, that switches ON and OFF to maintain a regulated output voltage. A half-bridge circuit includes a high side switch that is connected to an input voltage and a low side switch that is connected to ground. The high side and low side switches have a common switch node. The high side switch is turned ON when the low side switch is turned OFF, thereby coupling the switch node to the input voltage. The high side switch is turned OFF when the low side switch is turned ON to connect the switch node to ground.

The switch node is connected to an output inductor, which is connected to the load. Sensing the inductor current, i.e., the current through the output inductor, is critical for various purposes including overcurrent protection, etc. Inductor current sensing may be performed by employing fast current sensing amplifiers for both the high side and low side switches of the half-bridge. However, for low duty cycle applications, the requirement for amplifier response time for high side current sensing is demanding and becoming unattainable as frequency becomes higher, when the high side switch turn ON time is shorter than the blanking time.

SUMMARY

In one embodiment, a power supply includes a half-bridge circuit. The power supply further includes an output inductor connected to a switch node that is common to the high side switch and the low side switch of the half-bridge. During a turn ON time of the low side switch, a current detection circuit samples and holds in a capacitor a valley of an inductor current flowing through the output inductor. Also during the turn ON time of the low side switch, the current detection circuit samples and holds in another capacitor a peak of the inductor current. During a turn OFF time of the low side switch, a sense inductor current that is representative of the inductor current is generated by combining the charges stored in the capacitors.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
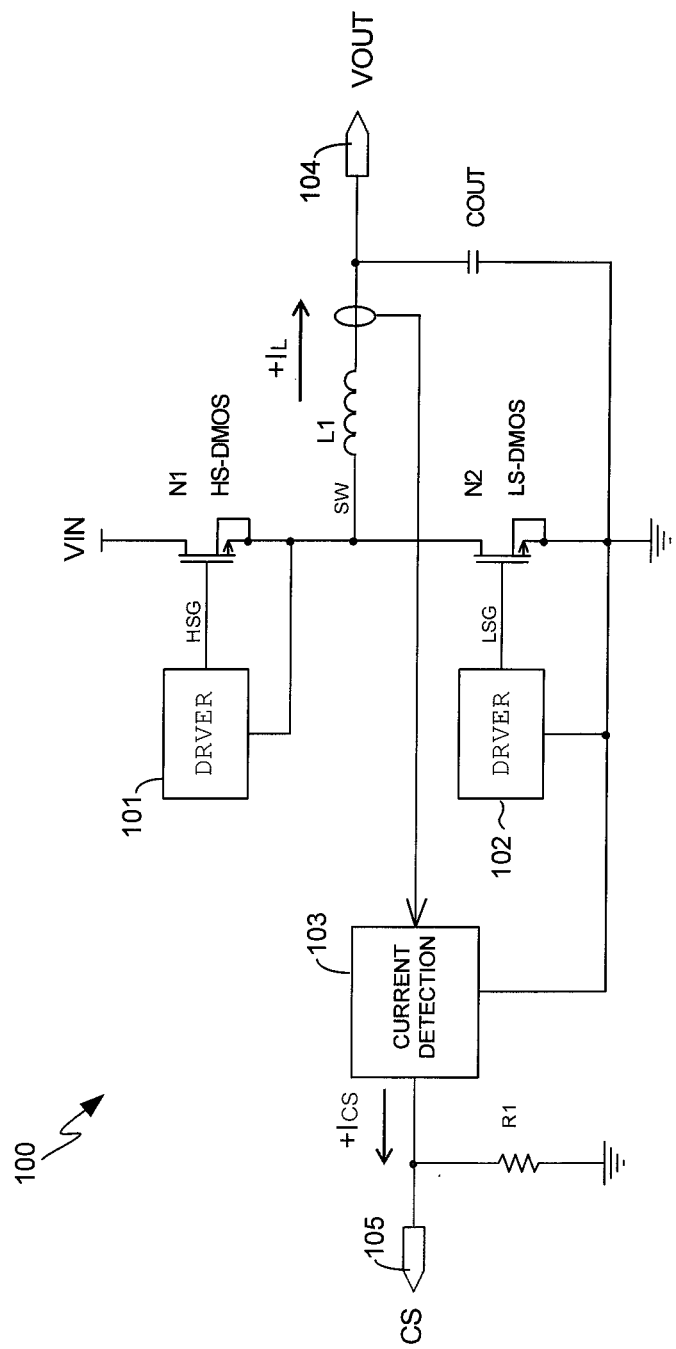
FIG. 1 shows a schematic diagram of a half-bridge circuit that may take advantage of embodiments of the present invention.

FIG. 1 shows a schematic diagram of a half-bridge circuit 100 that may take advantage of embodiments of the present invention. The half-bridge circuit 100 may be part of a DC-DC buck converter, for example. As can be appreciated, embodiments of the present invention are also generally applicable to other power supply topologies.

In the example of FIG. 1, the half-bridge circuit 100 comprises a high side switch N1 and a low side switch N2. Each of the high side switch N1 and low side switch N2 may comprise an N-channel Double Diffused Metal Oxide Semiconductor (DMOS) transistor, for example. The high side switch N1 has a drain that is connected to an input voltage (VIN), a source that is connected to a switch node SW, and a gate that is driven by a high side driver 101. The low side switch N2 has a drain that is connected to the switch node SW, a source that is connected to ground, and a gate that is driven by a low side driver 102. An output inductor L1 has a first end that is connected to the switch node SW and a second end that is connected to an output node 104. An output capacitor COUT has one end connected to the output node 104 and another end connected to ground. The inductor current (IL), i.e., the current through the output inductor L1, is positive (+IL) when the inductor current flows from the switch node SW to the output node 104. The inductor current is negative (−IL) when the inductor current flows from the output node 104 to the switch node SW.

The high side driver 101 turns ON the high side switch N1 and the low side driver 102 turns OFF the low side switch N2 to connect the switch node SW to the input voltage. The high side driver 101 turns OFF the high side switch N1 and the low side driver 102 turns ON the low side switch N2 to connect the switch node SW to ground. A regulated output voltage (VOUT) is maintained at the output node 104 by alternately driving the high side switch N1 and the low side switch S2. The switching operation of the high side switch N1 and the low side switch N2 may be controlled by pulse width modulation (PWM), for example.

A current detection circuit 103 senses the inductor current to generate a sense current (ICS), which is representative of the inductor current. The sense current has a positive sign, i.e., +ICS, when flowing towards a current sense node 105. The sense current may be sunk into a sense resistor R1 to develop a sense voltage on the current sense node 105. The sense voltage is representative of the inductor current, and may thus be employed to monitor the inductor current.

Figure 2:
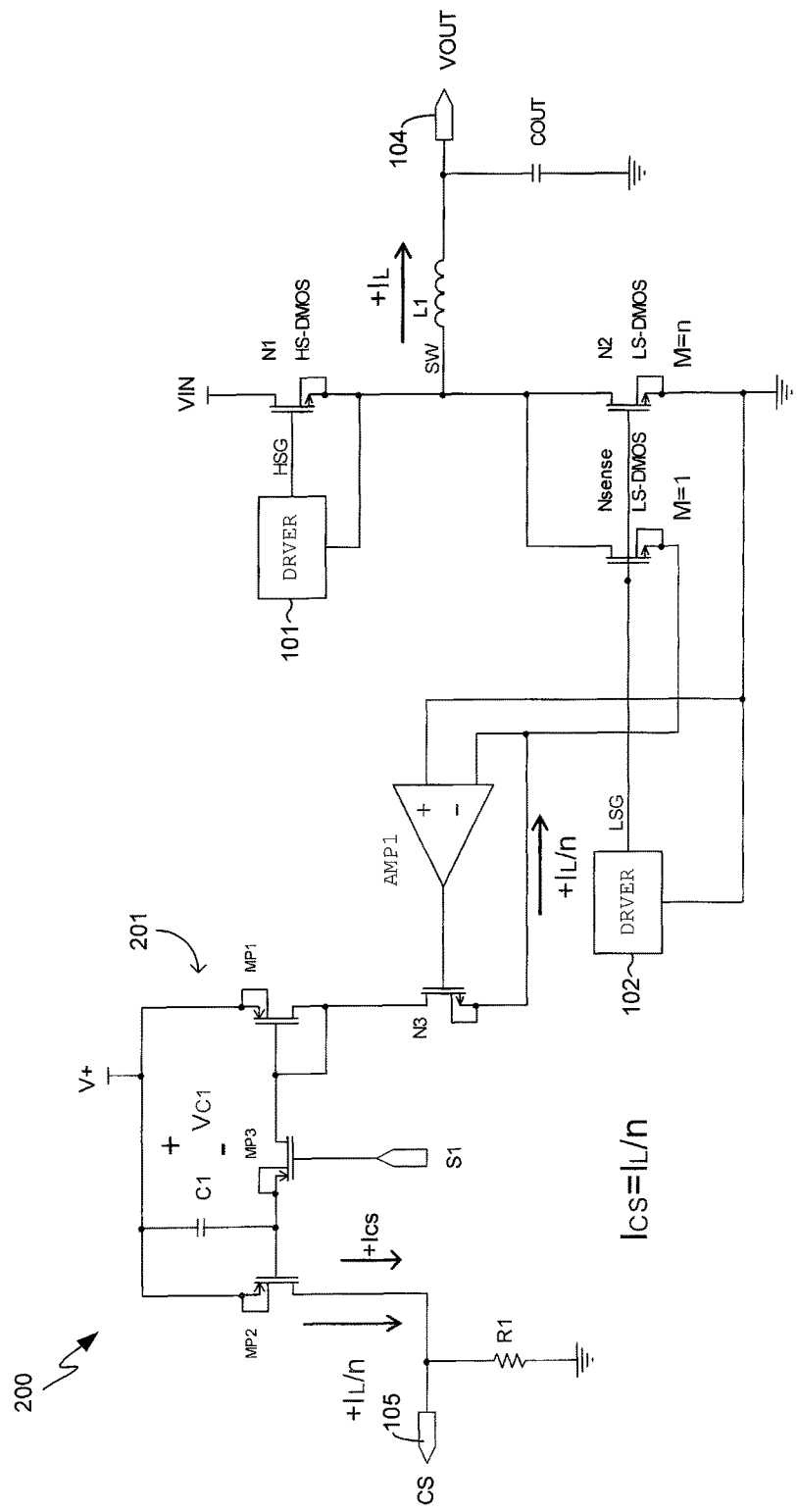
FIG. 2 shows a schematic diagram of a half-bridge circuit that may take advantage of embodiments of the present invention.

FIG. 2 shows a schematic diagram of a half-bridge circuit 200 that may take advantage of embodiments of the present invention. The half-bridge circuit 200 is a particular embodiment of the half-bridge circuit 100 FIG. 1, wherein the current detection circuit 103 performs low side positive inductor current sensing. That is, in the example of FIG. 2, the positive inductor current (+IL) is sensed by a current detection circuit that operates based on the switching of the low side switch N2. More particularly, in the example of FIG. 2, the positive inductor current is sensed when the low side switch N2 is turned ON.

In the example of FIG. 2, the low side switch N2 and a sense transistor Nsense are driven by the same low side drive signal LSG that is generated by the low side driver 102. As shown in FIG. 2, the transistor Nsense and the low side switch N2 may have a size ratio of 1:n. The half-bridge circuit 100 includes a current detection circuit 201 comprising transistors MP1, MP2, and MP3 When the transistor MP3 is ON, the gates of the transistors MP1 and MP2 are connected to form a current mirror that mirrors the positive inductor current. In the example of FIG. 2, the transistors MP1, MP2, and MP3 are p-channel DMOS transistors. Accordingly, the transistor MP3 is ON when the signal S1 on its gate is low, and is OFF when the signal S1 is high. The signal S1 may be generated by a controller (not shown) or another circuit without detracting from the merits of the present invention.

In the example of FIG. 2, the amplifier AMP1 is configured as a voltage follower that is connected to the node switch SW through the transistor Nsense. When the transistor Nsense is ON, the amplifier AMP1 drives a transistor N3 to recreate the positive inductor current through the transistors N3 and MP1, allowing the positive inductor current to be mirrored to the other side of the current mirror. The positive sense current (+ICS) is the mirrored positive inductor current flowing through the transistor MP2 and into the current sense node 105. The positive sense current is equal to the positive inductor current divided by n (i.e., +IL/n), which is the size ratio of the low side switch N2 (M=n) relative to the transistor Nsense (M=1).

Figure 3:
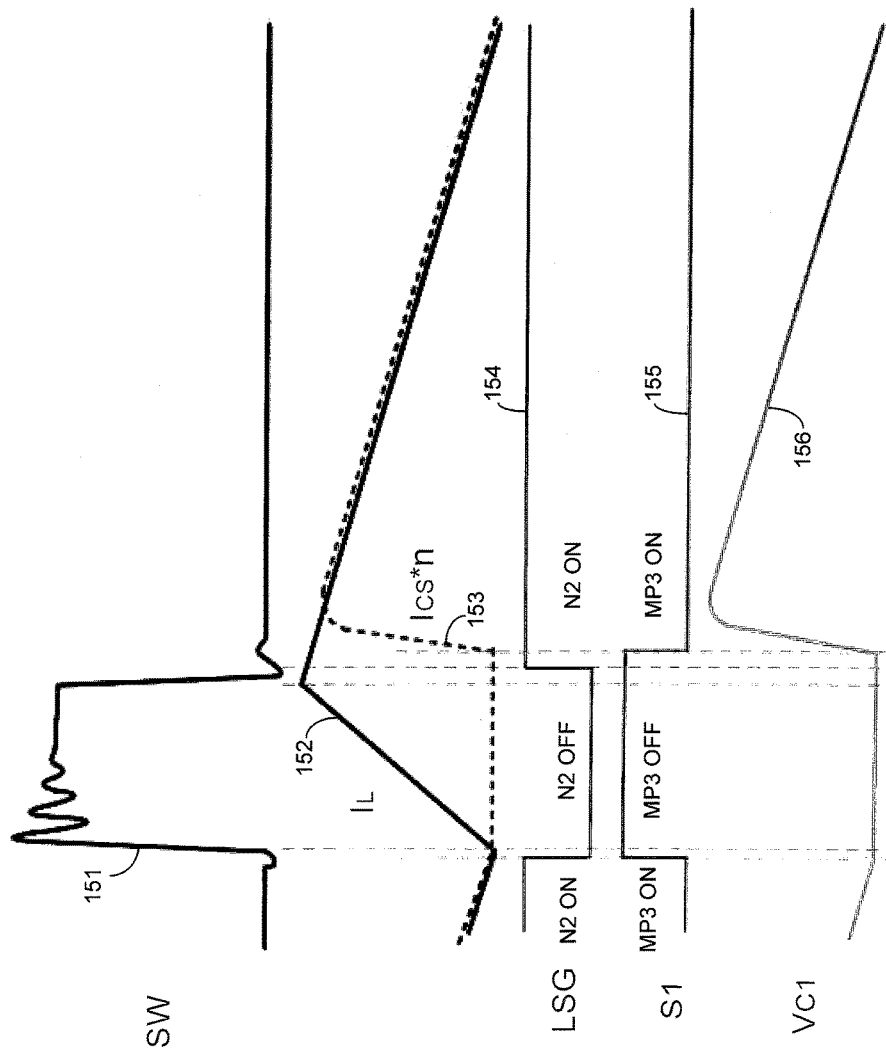
FIG. 3 shows a timing diagram of signals in the half-bridge circuit of FIG. 2.

FIG. 3 shows a timing diagram of signals in the half-bridge circuit 200. FIG. 3 shows the switch signal at the switch node SW (plot 151), the inductor current IL (plot 152), the low side drive signal LSG (plot 154), the gate signal S1 driving the transistor MP3 (plot 155), and the voltage VC1 on the capacitor C1 (plot 156). Referring to FIGS. 2 and 3, when the low side drive signal LSG is high and the signal S1 is low, the transistor MP3 is ON, the low side switch N2 is ON, and the transistor Nsense is ON, thereby resulting in the amplifier AMP1 driving the transistor N3 to allow the current detection circuit 201 to mirror the positive inductor current and generate a corresponding positive sense current (+ICS) to the current sense node 105.

When the low side drive signal LSG is low and the signal S1 is high, the transistor MP3 is OFF, the low side switch N2 is OFF, and the transistor Nsense is OFF, thereby disabling the current mirror and resulting in the transistor MP2 maintaining the valley (i.e., lowest point or value) of the positive inductor current as the voltage VC1 on the capacitor C1. Comparing the positive inductor current (plot 152) to the positive sense inductor current (plot 153), the positive sense current is not an adequate representation of the positive inductor current because it is missing values of the positive inductor current during the turn off time of the low side switch N2.

Figure 4:
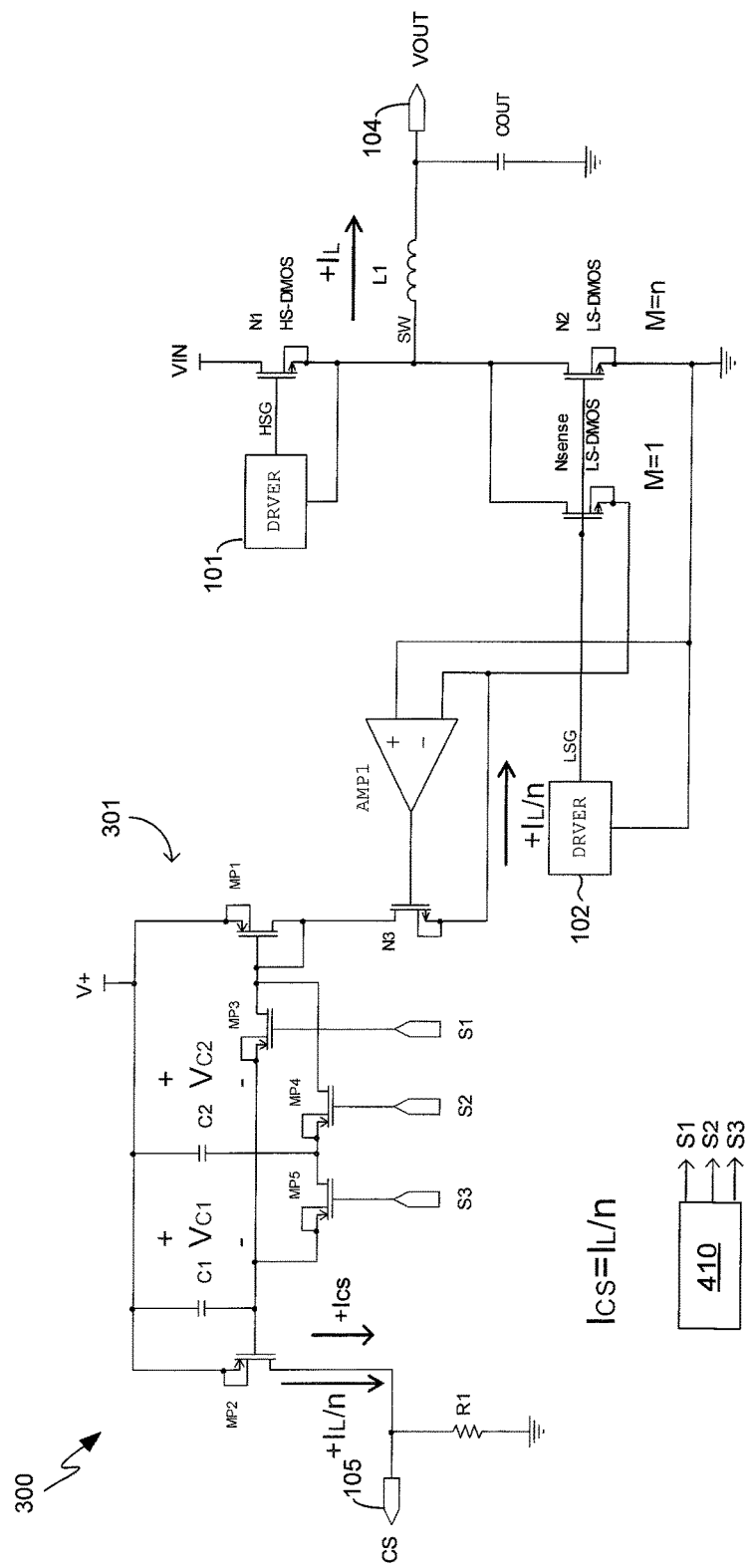
FIG. 4 shows a schematic diagram of a half-bridge circuit with average positive inductor current sensing in accordance with an embodiment of the present invention.

FIG. 4 shows a schematic diagram of a half-bridge circuit 300 in accordance with an embodiment of the present invention. The half-bridge circuit 300 is similar to the half-bridge circuit 200 of FIG. 2, except for using a current detection circuit 301 instead of the current detection circuit 201.

The current detection circuit 301 may comprise capacitors C1 and C2 and transistors MP1, MP2, MP3, MP4, and MP5. The transistors MP1, MP2, MP3, MP4, and MP5 are P-channel DMOS transistors in the example of FIG. 4. The transistors MP3, MP4, and MP5 are respectively controlled by the signals S1, S2, and S3, which may be generated by a controller 410 or other circuit.

In the example of FIG. 4, the transistor MP2 has a source that is connected to the supply voltage (V+), a drain that is connected to the current sense node 105, and a gate that is connected to a source of the transistor MP3. The transistor MP1 has a source that is connected to the supply voltage, a drain that is connected to a drain of the transistor N3, and a gate that is connected to a drain of the transistor MP3. The drain and gate of the transistor MP1 are connected together. The gate of the transistor MP3 is driven by the signal S1. The capacitor C1 has a first end that is connected to the supply voltage and a second end that is connected to the gate of the transistor MP2. The transistor MP5 has a source that is connected to the gate of the transistor MP2, a drain that is connected to a source of the transistor MP4, and a gate that is driven by the signal S3. The transistor MP4 has a source that is connected to the drain of the transistor MP5, a drain that is connected to the gate of the transistor MP1 and the drain of the transistor MP3, and a gate that is driven by the signal S2. The capacitor C2 has a first end that is connected to the supply voltage and a second end that is connected to the drain of the transistor MP5 and the source of the transistor MP4.

When the transistor MP3 is ON and the transistors MP5 and MP4 are OFF, the transistors MP2 and MP1 form a current a mirror that mirrors the positive inductor current and holds the valley of the positive inductor current as charge stored in the capacitor C1 as in the current detection circuit 201 of FIG. 2. When the transistors MP3 and MP4 are ON and the transistor MP5 is OFF, the positive inductor current is mirrored by the transistor MP1 to charge the capacitor C2, allowing the peak (i.e., highest point or value) of the positive inductor current to be stored as charge in the capacitor C2 when the transistor MP4 is turned OFF. When the transistors MP3 and MP4 are OFF and the transistor MP5 is ON, the charge stored in the capacitor C1 and the charge stored in the C2 are shared together to give an average of the stored charges, i.e., an average of the positive inductor current. The average of the stored charges is held as a gate-to-source voltage of the transistor MP2, which flows a positive sense current (+ICS) that is representative of the average of the positive inductor current during the turn OFF time of the low side switch N2.

By controlling the transistors MP3, MP4, and MP5 as described, the valley of the positive inductor current may be sampled and held in the capacitor C1 and the peak of the positive inductor current may be sampled and held in the capacitor C2 during the turn ON time of the low side switch N2, and the average of the positive inductor current may be generated by combining the charges stored in the capacitors C1 and C2 during the turn OFF time of the low side switch N2. This advantageously allows for low side current sensing to detect the average of the positive inductor current when the low switch N2 is OFF.

Figure 5:
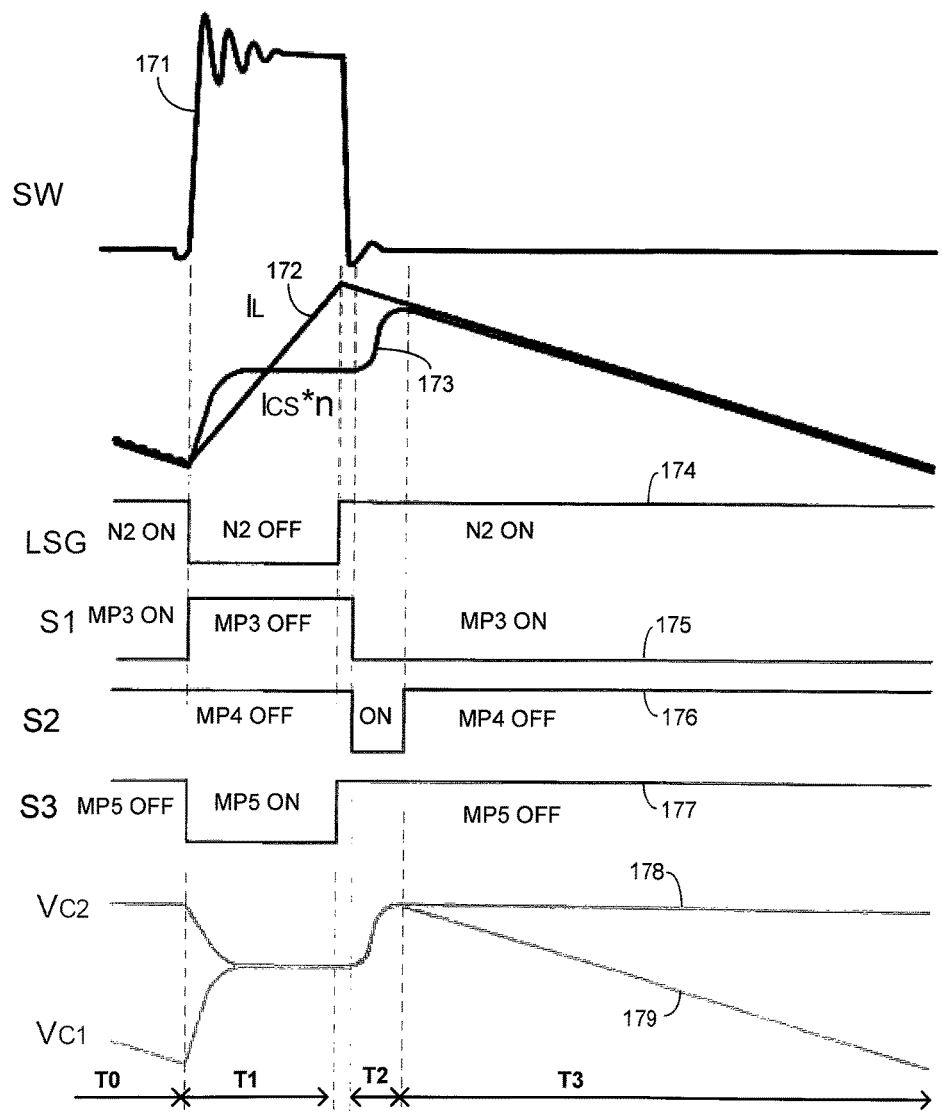
FIG. 5 shows a timing diagram of signals in the half-bridge circuit of FIG. 4 in accordance with an embodiment of the present invention.

FIG. 5 shows a timing diagram of signals in the half-bridge circuit 300 in accordance with an embodiment of the present invention. FIG. 5 shows the switch signal at the switch node SW (plot 171), the positive inductor current (plot 172), the low side drive signal LSG (plot 174), the gate signal S1 on the transistor MP3 (plot 175), the signal S3 driving the transistor MP5 (plot 177), the signal S2 driving the transistor MP4 (plot 176), the voltage VC2 on the capacitor C2 (plot 178), and the voltage VC1 on the capacitor C1 (plot 179).

Referring to FIGS. 4 and 5, during the time periods T0 and T3, the low side switch N2 and the transistor Nsense (both driven by the signal LSG) are ON, the transistor MP3 is ON, the transistor MP5 is OFF, and the transistor MP4 is OFF, thereby resulting in the amplifier AMP1 driving the transistor N3 to allow the positive inductor current to be mirrored to sample and hold the valley of the positive inductor current in the capacitor C1 (see VC1) on the rising edge of the signal S1 (i.e., when the transistor MP3 is turned OFF).

During the time period T2, the low side switch N2 and the transistor Nsense are ON, the transistor MP3 is ON, the transistor MP4 is ON, and the transistor MP5 is OFF, thereby resulting in the amplifier AMP1 driving the transistor N3 to allow the positive inductor current to be mirrored to sample and hold the peak of the positive inductor current in the capacitor C2 (see VC2) on the rising edge of the signal S2 (i.e., when the transistor MP4 is turned OFF)

During the time period T1, the low side switch N2 and the transistor Nsense are OFF, the transistor MP3 is OFF, the transistor MP4 is OFF, and the transistor MP5 is ON, thereby placing the capacitors C1 and C2 in parallel. This results in the charge stored in the capacitor C1 and the charge stored in the capacitor C2 to be shared, giving the average of the positive inductor current as the gate-to-source voltage of the transistor MP2. The resulting sense current from the transistor MP2 during the time period T1 is thus the average of the positive inductor current (see plot 173). The positive sense current flowing to the current sense node 105 is equal to ICS*n, where n is the size of the low side switch N2 relative to the transistor Nsense. Therefore, given n and the resistance of the resistor R1, the average positive inductor current may be determined from the voltage at the current sense node 105.

Figure 6:
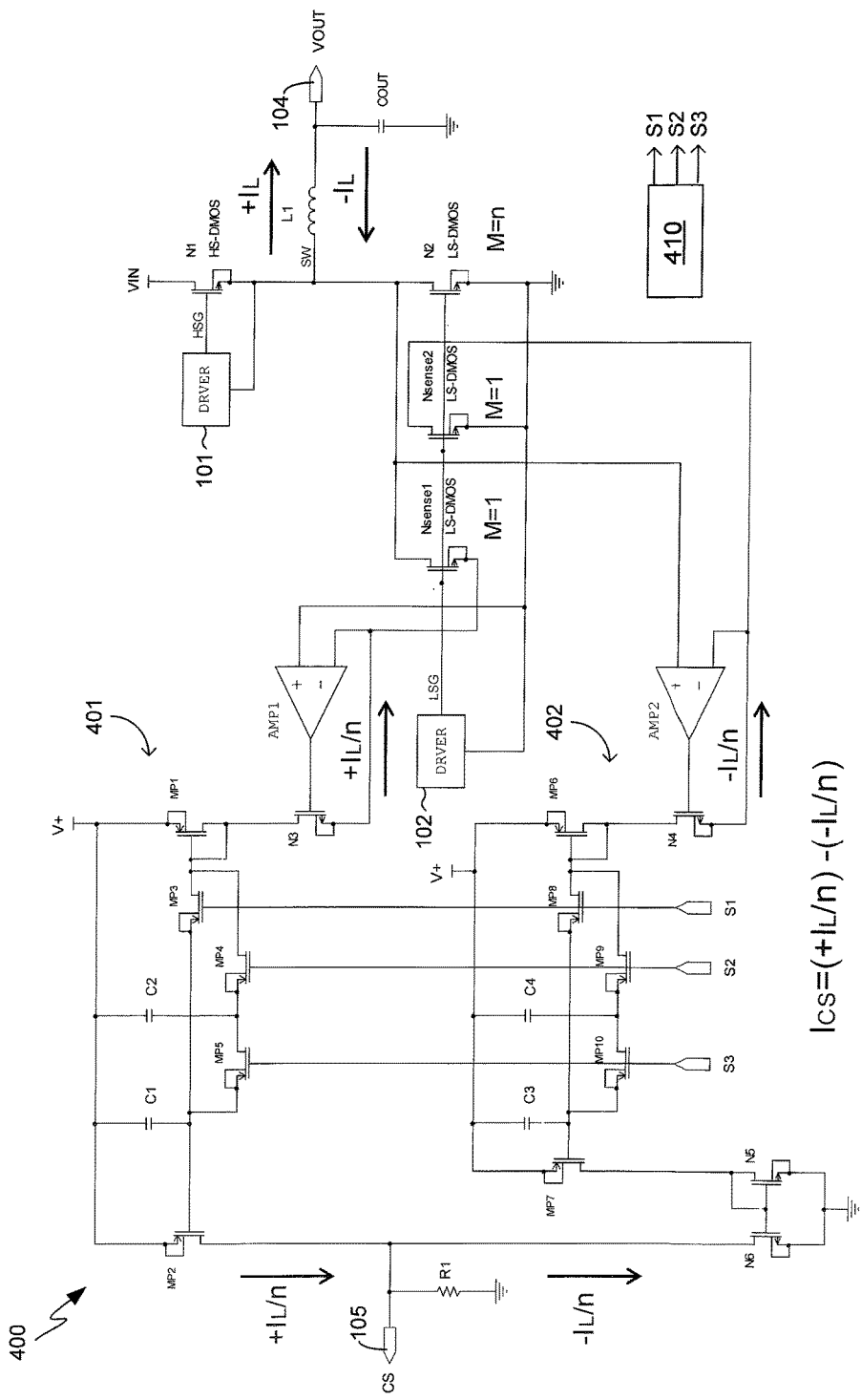
FIG. 6 shows a schematic diagram of a half-bridge circuit with average bi-directional inductor current sensing in accordance with an embodiment of the present invention.

FIG. 6 shows a schematic diagram of a half-bridge circuit 400 in accordance with an embodiment of the present invention. The half-bridge circuit 400 is similar to the half-bridge circuit 300 of FIG. 4 except for the use of two current detection circuits, namely a current detection circuit 401 for detecting the average of the positive inductor current (+IL) and a current detection circuit 402 for detecting the average of the negative inductor current (−IL). The half-bridge circuit 400 allows for average bi-directional inductor current sensing. The half-bridge circuit 400 is thus suitable for applications where the inductor current may flow back to the power supply.

The current detection circuit 401 comprises the transistors MP1, MP2, MP3, MP4, and MP5 and capacitors C1 and C2. The current detection circuit 401 works in conjunction with the amplifier AMP1, transistor N3, and the transistor Nsense1 (Nsense in FIG. 4) to sense the positive inductor current as previously described with reference to the current detection circuit 301 of FIG. 4.

The current detection circuit 402 comprises the transistors MP6, MP7, MP8, MP9, and MP10 and capacitors C3 and C4. The current detection circuits 401 and 402 are essentially the same circuits. More particularly, the transistor MP6 corresponds to the transistor MP1, the transistor MP7 corresponds to the transistor MP2, the transistor MP8 corresponds to the transistor MP3, the transistor MP9 corresponds to the transistor MP4, the transistor MP10 corresponds to the transistor MP5, the capacitor C3 corresponds to the capacitor C1, and the capacitor C4 corresponds to the capacitor C2.

The components of the current detection circuit 402 work similarly to corresponding components of the current detection circuit 401. That is, the transistors MP8, MP9, and MP10 are driven by the signal S1, S2, and S3, respectively, to sample and hold the valley of the negative inductor current in the capacitor C3 and to sample and hold the peak of the negative inductor current in the capacitor C4 during the turn ON time of the low side switch N2. The average of the negative inductor current is generated by sharing the charges stored in the capacitors C3 and C4 during the turn OFF time of the low side switch N2.

The half-bridge circuit 400 includes a transistor Nsense2, amplifier AMP2, and transistor N4 to allow for mirroring of the negative inductor current. These components provide the same function for the current detection circuit 402 as the transistor Nsense1, amplifier AMP1, and transistor N3 provide for the current detection circuit 401. With the bi-directional current sensing, the sense current ICS is given by $$ICS = \frac{+IL}{n} - \frac{-IL}{n} \tag{EQ. 1}$$

where (+IL) is the positive inductor current, (−IL) is the negative inductor current, and n is the size of the low side switch N2 relative to the size of the transistor Nsense1/Nsense2.

Figure 7:
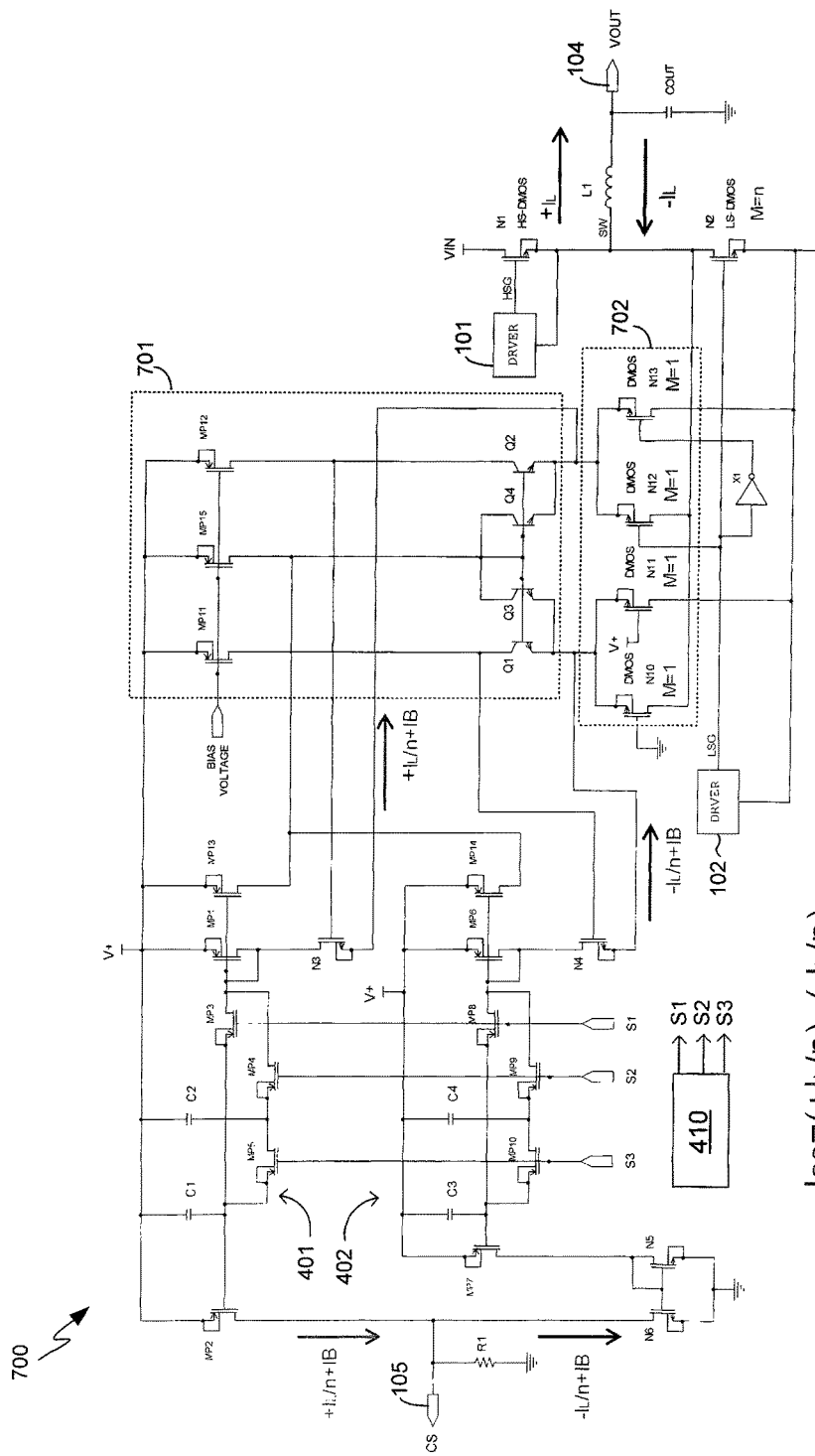
FIG. 7 shows a schematic diagram of a half-bridge circuit with differential inductor current sensing in accordance with an embodiment of the present invention.

FIG. 7 shows a schematic diagram of a half-bridge circuit 700 in accordance with an embodiment of the present invention. The half-bridge circuit 700 is similar to the half-bridge circuit 600 of FIG. 6, except that the half-bridge circuit 700 employs the current detection circuits 401 and 402 for differential inductor current sensing. Generally, in the example of FIG. 7, the current detection circuits 401 and 402 operate as previously described with reference to FIG. 6.

In the example of FIG. 7, a single-ended to differential converter 702 converts the single-ended signal at the switch node SW to a differential signal pair, which is input to a differential amplifier 701. The differential amplifier 701 outputs a (+) polarity signal to the transistor N3 and a (−) polarity signal to the transistor N4 to sense the positive inductor current and the negative inductor current. The resulting sense current ICS is the same as given by EQ. 1 above. The differential current sensing of the half-bridge circuit 700 provides better noise rejection and faster current sinking capability, which may be critical in some applications.

Figure 8:
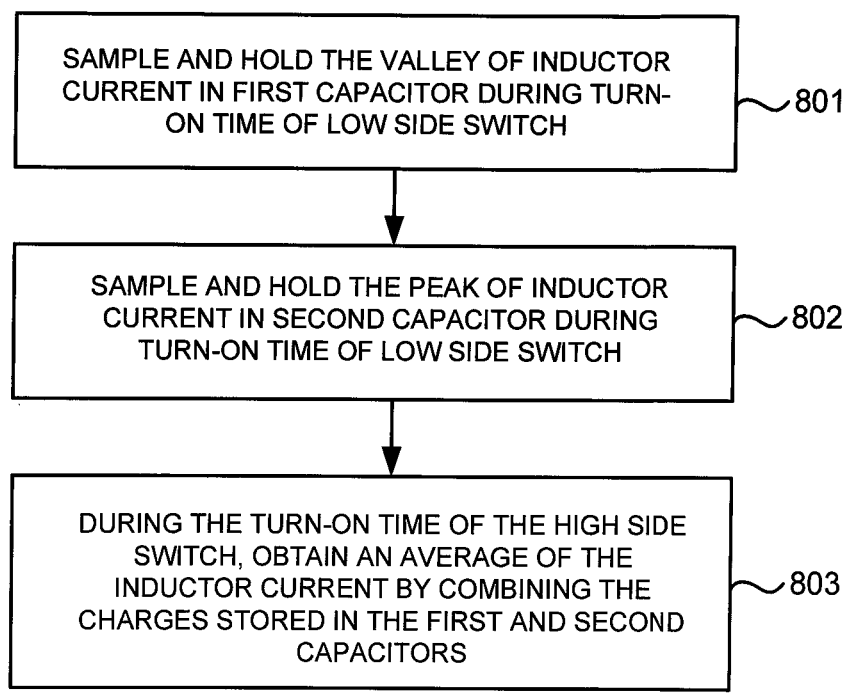
FIG. 8 shows a flow diagram of a method of detecting an inductor current in accordance with an embodiment of the present invention.

FIG. 8 shows a flow diagram of a method of detecting an inductor current in accordance with an embodiment of the present invention. The method of FIG. 8 may be employed in conjunction with a half-bridge circuit.

In the example of FIG. 8, the valley of inductor current is sampled and held in a first capacitor during a turn ON time of a low side switch of the-bridge circuit (step 801). Also during that turn ON time of the low side switch, the peak of the inductor current is sampled and held in a second capacitor (step 802). During the turn OFF time of the low side switch, the average value of the inductor current is generated by combining the charges stored in the first capacitor and in the second capacitor (step 803). For example, the first capacitor may be placed in parallel with the second capacitor during the turn OFF time of the low side switch to combine the charge stored in the first capacitor with the charge stored in the second capacitor.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An electrical circuit comprising:
a half-bridge circuit comprising a high side switch and a low side switch;
an output inductor that is connected to a switch node that is connected to a terminal of the high side switch and a terminal of the low side switch; and
a current detection circuit that samples and holds in a first capacitor a peak of an inductor current flowing through the output inductor during an ON time of the low side switch, samples and holds in a second capacitor a valley of the inductor current during the ON time of the low side switch, and generates a sense inductor current that is representative of the inductor current by combining charges stored in the first and second capacitors during a turn OFF time of the low side switch.

2. The electrical circuit of claim 1, wherein the current detection circuit comprises a current mirror that mirrors the inductor current.

3. The electrical circuit of claim 1, wherein the high side switch comprises a drain that is connected to an input voltage, a gate that receives a high side gate drive signal, and a source that is connected to the switch node.

4. The electrical circuit of claim 3, wherein the low side switch comprises a drain that is connected to the source of the high side switch and to the switch node, a gate that receives a low side gate drive signal, and a source that is connected to ground.

5. The electrical circuit of claim 1, further comprising a resistor that comprises a first end that is connected to ground and a second end that is connected to a current sense node.

6. The electrical circuit of claim 5, wherein the sense inductor current flows to the current sense node to generate a voltage drop on the resistor, the voltage drop being indicative of an average of the inductor current.

7. The electrical circuit of claim 1, wherein the inductor current is a positive inductor current that flows from the switch node to a load.

8. The electrical circuit of claim 1, wherein the inductor current is a negative inductor current that flows towards the switch node.

9. The electrical circuit of claim 1, wherein the electrical circuit comprises a DC-DC buck converter.

10. An electrical circuit comprising:
a half-bridge circuit comprising a high side switch and a low side switch;
an output inductor that is connected to a switch node of the half-bridge circuit;
a first current detection circuit that samples and holds in a first capacitor a peak of a positive inductor current flowing from the switch node through the output inductor during a turn ON time of the low side switch, samples and holds in a second capacitor a valley of the positive inductor current during the turn ON time of the low side switch, and generates a positive sense inductor current that is representative of the positive inductor current by combining charges stored in the first and second capacitors during a turn OFF time of the low side switch; and
a second current detection circuit that samples and holds in a third capacitor a peak of a negative inductor current flowing through the output inductor towards the switch node during the turn ON time of the low side switch, samples and holds in a fourth capacitor a valley of the negative inductor current during the turn ON time of the low side switch, and generates a negative sense inductor current that is representative of the negative inductor current by combining charges stored in the third and fourth capacitors during the turn OFF time of the low side switch.

11. The electrical circuit of claim 10, further comprising:
a single-ended to differential converter that converts a single-ended signal on the switch node to a differential signal pair; and
a differential amplifier that receives the differential signal pair and drives the first current detection circuit with a positive polarity output and the second current detection circuit with a negative polarity output.

12. The electrical circuit of claim 10, wherein the first current detection circuit combines the charges stored in the first and second capacitors during the turn OFF time of the low side switch by connecting the first capacitor across the second capacitor.

13. The electrical circuit of claim 10, wherein the electrical circuit comprises a DC-DC buck controller.

* * * * *